Aug. 18, 1925.
H. THOMA
1,550,467
MEANS FOR REGULATING ELECTRIC CURRENT GENERATORS
Filed March 14, 1924
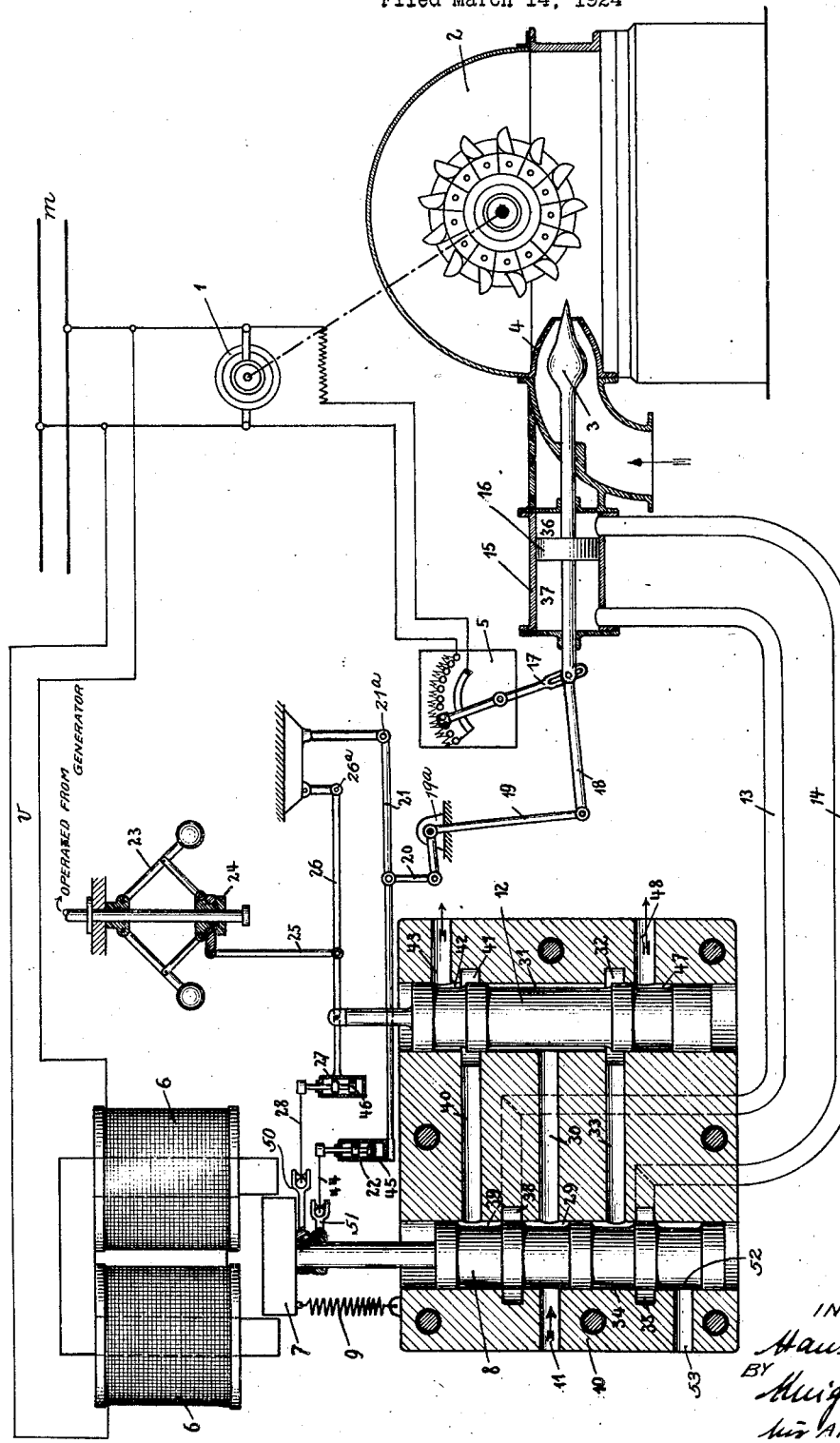
INVENTOR
Hans Thoma
BY
his ATTORNEYS Patented Aug. 18, 1925.

1,550,467

UNITED STATES PATENT OFFICE.

HANS THOMA, OF MUNICH, GERMANY, ASSIGNOR TO NEUFELDT & KUHNKE, OF RAVENSBERG, NEAR KIEL, GERMANY, A CORPORATION OF GERMANY.

MEANS FOR REGULATING ELECTRIC-CURRENT GENERATORS.

Application filed March 14, 1924. Serial No. 699,349.

*To all whom it may concern:*

Be it known that I, HANS THOMA, a citizen of Germany, and residing at Munich, Germany, have invented certain new and useful Improvements in Means for Regulating Electric-Current Generators, of which the following is a full specification, illustrated in the accompanying drawings, the particular novel features of my invention being more specifically pointed out in the annexed claims.

The usual method and means for regulating electric current generators, in particular dynamo electric machinery, comprise the provision of an automatic regulator for controlling the speed of the prime mover for the generator and the further provision of an automatic voltage regulator, which has the purpose of maintaining the voltage of the generator constant at varying loads irrespective of the constant speed of the generator which is taken care of by the first mentioned speed control means.

Devices of this character have the disadvantage that even in the simplest installations two automatic regulators must be provided, a speed regulator and a voltage regulator. Therefore, designers frequently omit the voltage regulator and only provide a speed regulator in order to simplify the installations. This, however, has the disadvantage that while thus the speed, and consequently in alternating current systems, the frequency of the current, is maintained constant, the values of the line voltage are still subject to undesirable variations. On the other hand, in practice it is by far more important to maintain the voltage constant than the frequency.

According to the present invention the difficulties above mentioned are removed by providing only one sensitive quickly acting regulator whose control element is responsive to voltage variations and whose mechanical control elements act upon the power supply to the prime mover. However, in order to avoid in such automatic regulators the detrimental effect of the magnetic and mechanical inertia of the power plant, it becomes necessary to provide such a regulator with compensating means which subjects the effective operation of the automatic regulator to the position of the power control means of the prime mover, and to the electrical control means of the generator.

The distinctive features of my present invention over the compensating devices of the present day art consist in an arrangement by which the compensating means either directly affect the voltage responsive elements of the regulator or, intermediately, the operating elements connected with it, in such manner that the sensitive regulating means which respond to variations in voltage and in turn the mechanical control means operated thereby have a secondary or return connection by which the detrimental over-regulation is prevented. In other words, if the voltage responsive means initially call for instance for an increase in voltage and accordingly by their operation tend to bring about electrically an increase in voltage at the generator and at the same time tend to increase the speed of the prime mover for the same purpose, the mechanical control means directly connected to the prime mover and to the generator, by suitable return connections to the voltage responsive means, will tend to check the action of the latter as soon as the initial action of the voltage responsive means commences to take effect.

Only in this manner is it possible to avoid the detrimental influence of the inertia of rotating masses as well as of the magnetic inertia, so that a quick and exact voltage regulation to the desired point is obtained.

In some instances it is also desirable to add to this compensator a second compensator which is connected with speed responsive means such as for instance a governor and which in turn is connected to the shaft of the prime mover of the generator and which by similar compensating mechanism also tends to counteract the initial regulating movements of the voltage responsive regulator. These last mentioned means may be of particular advantage as an expedient for avoiding the running away of the prime mover because in that case the checking action of the speed responsive device is such that it immediately takes control of the power supply to the prime mover irrespective as to whether the voltage responsive means may call for an increase in voltage and thus an increase in generator speed or not.

My invention is illustrated in the accompanying drawing which represents diagrammatically a form in which my invention may be reduced to practice, some of the mechanical portions in this illustration being shown in longitudinal vertical section. Some of the mechanical elements shown appear out of proportion in size relatively to some of the other mechanical elements for the purpose of clearness.

Referring to the drawing, a generator 1 is diagrammatically represented feeding into the mains $m$. The generator may be driven for instance by a Pelton wheel 2 as a prime mover. It is intended to maintain the voltage in the mains constant by firstly operating the cone 3 of the Pelton wheel nozzle 4 so as to regulate the pressure fluid supply and secondly by operating the field rheostat 5 of the generator.

This is accomplished in the following manner: From the mains is branched off a circuit $v$ which contains the relay coils 6 of a voltage sensitive relay. The relay is provided with an armature 7 which is more or less attracted by the relay according to the variation of the generator voltage. The pulling power of the relay against the armature 7 is counteracted by the weight of the armature and the elements connected with it and by a spring 9. The cone 3 of nozzle 4 is controlled by means of a servo motor consisting of a cylinder 15 and a piston 16 disposed therein and connected to the nozzle 3. Thus when pressure fluid is supplied to the cylinder to one or the other side of the piston, the piston will be moved in one or the other direction and thus open or close the power supply nozzle 4 as the situation may require. To the other side of the piston is connected the arm 17 of field rheostat 5, so that the latter is operated simultaneously with cone 3 of the power supply nozzle. The manner in which auxiliary pressure fluid is supplied to the piston 16 of the servo motor is as follows:—

A valve casing 10 is provided (shown in longitudinal vertical section in the figure in exaggerated large scale relatively to the generator and prime mover) which contains a main control piston valve 8 and an auxiliary piston valve 12. The main piston valve 8 is provided with a number of portions restricted in diameter such that annular spaces 39, 29 and 34 are formed between the piston valve and the cylindrical portion of the casing in which it operates. Likewise auxiliary piston valve 12 is provided with a number of restricted portions such that annular spaces 32, 41 and 47 are formed. Pressure fluid for operating the servo motor is supplied to the valve casing through inlet 11. In the position in which the two pistons are shown for example, the pressure fluid entering inlet 11, passes into annular space 29 of piston valve 8, thence through boring 30 in the valve casing into annular space 31 of auxiliary valve 12. Owing to the position of this valve, the pressure fluid may pass from space 31 into annular space 32 provided in the valve casing, thence through boring 33 into annular space 34, where further passage of the fluid in the position of valve 8 shown is stopped. However, if valve 8 should be slightly lowered, the fluid may continue, passing into annular space 35 and through supply pipe 14 into space 36 of the servo motor where it may exert its pressure and move piston 16 to the left. If piston 8 is thus lowered as described, the portion 37 of the servo motor cylinder 15, which through pipe 13 communicates directly with annular space 38 of the valve casing, is brought into communication with annular space 39 and thence with duct 40 and with annular space 42 in the position of auxiliary valve 12 as shown, and thus brought into communication with exhaust port 43. Thus when the pressure fluid acting in space 36 of the servo motor upon its piston 16 tends to move the piston to the left, the pressure fluid contained in space 37 of the motor cylinder may escape through exhaust port 43. When piston valve 8 is raised instead of lowered the pressure fluid passes from annular space 29 through space 38 and supply pipe 13 into space 37 of the motor cylinder thus tending to push the piston 16 to the right. In that position of slide valve 8 its annular space 52 has been brought into registry with annular space 35 which connects the servo motor space 36 through pipe 14 so that now pressure fluid may be discharged from that side of the piston through discharge port 53. There is provided a further exhaust port 48 for the pressure fluid which registers with annular space 47 of auxiliary piston valve 12, and which when this valve is raised may be brought into communication with annular space 32 and through duct 33 into communication with annular space 34, and when main piston valve 8 happens to be lowered, conduit 14 may be connected to space 34, so that pressure fluid may exhaust from cylinder portion 36 of the servo motor through exhaust port 48. The details of the operation of these two valves will be described later on.

Main piston valve 8 is connected to the armature 7 of the relay. Furthermore, the rear end of servo motor piston 16 which is connected to the field rheostat 5 is connected through the link system 18, 19, 20 to a one-armed lever 21. In this link connection, 19 represents a bell crank pivoted at 19$^a$. Lever 21 is pivoted at 21$^a$ and carries at its outer free end a dash-pot 22 filled with a suitable liquid, for instance glycerine or the like. In this dash-pot operates a piston 45 to the outer end of which is fixed a leaf spring 44, the free end of which rests between the prongs of a forked arm 51 fixed to armature 7. Thus when the free end of lever 21 is raised and thereby the dash-pot 22, its piston 45, owing to the initial dash-pot resistance, will first follow this movement, and leaf spring 44, being thus put under tension, will exert a yielding upward pressure against armature 7 thereby tending to lift it. This tendency will only last until the pressure of the fluid within the dash-pot has been equalized. Thus only a temporary lifting force is exerted against armature 7 and thus against piston valve 8.

A governor 23 is provided in this system which is operated from the generator shaft or any other suitable portion of the rotating system connected with the generator, so that its speed will vary proportionally to the generator speed. The collar 24 of the governor is connected through a link 25 to a second one-armed lever 26 pivoted at 26ª such that the lever will be raised and lowered with the governor collar according to the speed at which the governor revolves. Auxiliary piston valve 12 is pivotally attached to lever 26 and this lever furthermore carries at its outer free end a dash-pot 27 containing piston 46 and being likewise filled with suitable fluid. The outer end of piston 46 carries a leaf spring 28 which engages between the forked ends of a second arm 50 also attached to armature 7. The operation of this dash-pot is similar to that described with reference to dash-pot 22, namely, when lever 26 and thus dash-pot 27 is raised, a temporary lifting force is exerted against armature 7 until the fluid pressure in dash-pot 27 has been equalized.

The operation of the device is as follows: So long as the generator voltage and speed are both normal, the piston valves 8 and 12 remain in the position shown and the entire control device is at rest. This rest position is due to the fact that the auxiliary pressure fluid supply entering through inlet port 11 of the valve casing, passing through duct 30 and annular space 31 into duct 33 and annular space 34 is blocked from further passage by the position of valve 8 in which it closes communication between space 34 and fluid conduit 14. Likewise fluid conduit 13 communicating with the other side of the servo motor piston is closed by piston 8 at the annular space 38.

If now for instance the load of the generator is increased, its revolution number will drop and likewise its voltage so that now the magnetic pull of relay 6 upon its armature 7 decreases, which results in a downward movement of piston valve 8. Thereby communication between annular space 34 of this piston and duct 14 is established and pressure fluid is admitted to space 36 of the servo motor. At the same time, communication between the other side 37 of the servo motor is established through duct 13 which now can discharge fluid from the end of the duct through annular spaces 38, 39, duct 40, annular spaces 41 and 42 and discharge opening 43. This establishes a higher pressure in servo motor space 36 over that existing in space 37 and consequently the motor piston 16 moves to the left and further opens the Pelton wheel nozzle 4. At the same time, rheostat arm 17 is moved in a direction which decreases the field resistance and thus tends to increase the voltage of the generator. Through the further opening of nozzle 4 the speed of the turbine 2 is increased at the same time. However, this increase in voltage and in speed does not occur instantaneously but only gradually during a certain time period, due to the mechanical and magnetic inertia of the power plant. In order to prevent an over-regulation, which is due to this inertia, the hereinbefore described dash-pot arrangement is provided.

It will be noted that when in the example described hereinbefore, servo motor piston 16 moves to the left, lever 21, by virtue of the link connection 18, 19, 20, is raised, and thereby also dash-pot 22 is raised. This, as has also been described, causes a yielding upward pressure through leaf spring 44 against armature 7, which tends to lift piston valve 8 and thus tends to shut off the auxiliary pressure fluid supply heretofore furnished through conduit 14. At the same time, owing to the increase in speed of the prime mover, collar 24 of governor 23 is raised and thus raises lever 26, which in turn, causes, through leaf spring 28, likewise a yielding upward pressure against armature 7 and thus aids leaf spring 44 in its tendency to raise sliding piston 8 and to decrease the auxiliary pressure fluid supply to the servo motor. As a consequence and as a final result, sliding piston 8 will assume very soon a higher position than the drop in voltage had originally called for, so that therefore, before the normal voltage has been attained, the regulating movement is slowed down. However, owing to the action of dash-pots 22 and 27, described before, the upward pressure of leaf springs 44 and 28 is gradually lessened as the fluid pressure in the two dash-pots is equalized, so that it soon disappears altogether. By suitably designing the two dash-pots, the time period within which this upward pressure of the leaf springs disappears, can be gauged so that for the under-normal circumstances, the servo motor gradually ceases to increase the power supply to the prime mover and the generator excitation to prevent acceleration of the power plant beyond the point at which the normal voltage is re-established. When this occurs the relay will again attract armature 7 to a sufficient extent to return piston valve 8 into a position in which the servo motor is entirely at rest.

On the other hand, in case the generator load decreases, its voltage and speed will increase, which causes the relay 6 to lift its armature 7 and thus piston valve 8 above the normal position shown, and thus by the means described hereinbefore, the auxiliary pressure fluid supply to the servo motor will be reversed and the servo motor piston 16 will move to the right and tend to close the Pelton wheel nozzle, and at the same time to decrease the excitation of the generator field through rheostat 5. In this case, through levers 21 and 26 and their respective dash-pots, a downward pressure is produced by means of leaf springs 44 and 28 which tends to return piston valve 8 to the normal closing position.

Some time it may happen that while the relay 6 becomes under-excited due to decrease in voltage, the prime mover exceeds its normal speed. In this case, the governor 23 whose speed is proportional to the speed of the prime mover acts to a considerable extent upon lever 26 and thus raises auxiliary piston 12 and thus moves it from its normal position shown. In this case, the servo motor pressure fluid supplied to auxiliary piston 12 through duct 30 is shut off from annular space 32 and duct 33 and is instead led into annular space 41, whence it passes through duct 40 and annular space 39 into annular space 38 (it was assumed before, that due to low voltage, piston valve 8 had been slightly lowered). From space 38 it then passes into conduit 13 and into space 37 of the servo motor and thus moves its piston 16 to the right instead of to the left. Owing to the raising of auxiliary valve 12, servo motor space 36 through conduit 14 is directly connected to the outside by way of annular space 34, duct 33, annular space 47 and discharge port 48 owing to the raised position of auxiliary voltage 12. This will, as a consequence, cause the closing of the turbine nozzle and the lowering of the speed of the prime mover notwithstanding the fact that, as has been stated hereinbefore, the voltage of the generator may be such that relay 6 calls and tends to set the servo motor control valve 8 for an increase in speed. Thus it will be noted that this safety device, which prevents excessive speed of the prime mover, operates through an auxiliary control device independently of the main servo motor control device irrespective as to whether the main control device, which is responsive to variations in voltage, tends to increase the voltage by tending to increase the speed and the field excitation.

While I have shown and described my invention by way of an electric energy producer in which two operating functions, the speed and the voltage, are regulated and checked against each other, it is obvious that the particular novel features involved in this invention are applicable to any kind of energy producer where it is desired to keep several of its operating functions constant.

I claim:—

1. A regulator for maintaining at least two operating functions of energy producing apparatus constant, comprising means for controlling one operating function and means for controlling the other operating function, a first element sensitive to variations of the first operating function and being responsively connected to said energy producer, actuating means connected to and controlled by said first sensitive element for actuating the controlling means for both of said operating functions, and compensating means connected with said controlling means for both functions and adapted to follow their operating positions and being yieldingly connected to said first sensitive element for checking and counteracting the control operations of said sensitive element upon said actuating means for predetermined time periods to prevent over regulation of said energy producer, and a second element sensitive to variations of the second operating function of said energy producer and being yieldingly connected to said first sensitive element for checking and counteracting the control operations of said first element for predetermined time periods independently of the requirements for regulation of the first operating function.

2. A voltage regulator for maintaining the voltage of an electric generator constant, comprising means for regulating the generator voltage, means for regulating the generator speed, a relay sensitive to voltage variations connected to the generator, operating means controlled by said relay for actuating said voltage and speed regulating means and compensating means connected with said regulating means and adapted to follow their operating positions and being yieldingly connected to said relay for checking and counteracting the control operations of said relay during the regulating operations for predetermined time periods to prevent over regulation of said generator, and means responsive to speed variations of the generator and being yieldingly connected to said relay for checking and counteracting the control operations of said relay during the regulating operations for predetermined time periods independently of the requirements for voltage regulation.

3. A voltage regulator for maintaining the voltage of an electric generator constant, comprising a servo motor for regulating the generator speed and voltage, means for controlling said servo motor and a relay responsive to voltage variations connected to said generator and adapted to actuate said servo motor control means and compensating levers connected to said servo motor and adapted to follow its regulating operations, a yielding connection between said compensating levers and said relay comprising a leaf spring and a dash-pot, said levers when operated by the servo motor being adapted to check and counteract the actuating movements of said relay which cause the operation of the servo motor, the time period of such counteraction being determined by the adjustment of said dash-pot to prevent over-regulation of the generator by said servo motor, and speed responsive means connected to said generator and a yielding lever connection between said means and said relay likewise comprising a leaf spring and a dash-pot for checking and counteracting the actuating operations of said relay for predetermined time periods, depending upon the dash-pot adjustment, independently of the checking and counteracting operations of the first named compensating levers.

4. A voltage regulator for maintaining the voltage of an electric generator constant, comprising a servo motor for regulating the generator speed and voltage, means for controlling said servo motor and a relay responsive to voltage variations connected to said generator and adapted to actuate said servo motor control means and compensating levers connected to said servo motor and adapted to follow its regulating operations, a yielding connection between said compensating levers and said relay comprising a leaf spring and a dash-pot, said levers when operated by the servo motor being adapted to check and counteract the actuating movements of said relay which cause the operation of the servo motor, the time period of such counteraction being determined by the adjustment of said dash-pot to prevent over-regulation of the generator by said servo motor, and speed responsive means connected to said generator and a yielding lever connection between said means and said relay likewise comprising a leaf spring and a dash-pot for checking and counteracting the actuating operations of said relay for predetermined time periods, depending upon the dash-pot adjustment, independently of the checking and counteracting operations of the first named compensating levers, and separate control means for said servo motor interposed between the relay actuated means and the servo motor and connected to said speed responsive means and adapted to control said servo motor independently of the actuating position of the relay in case of excessive generator speed.

HANS THOMA.